No. 699,486. Patented May 6, 1902.
C. P. BREINING.
CURRYCOMB.
(Application filed Sept. 11, 1901.)
(No Model.)
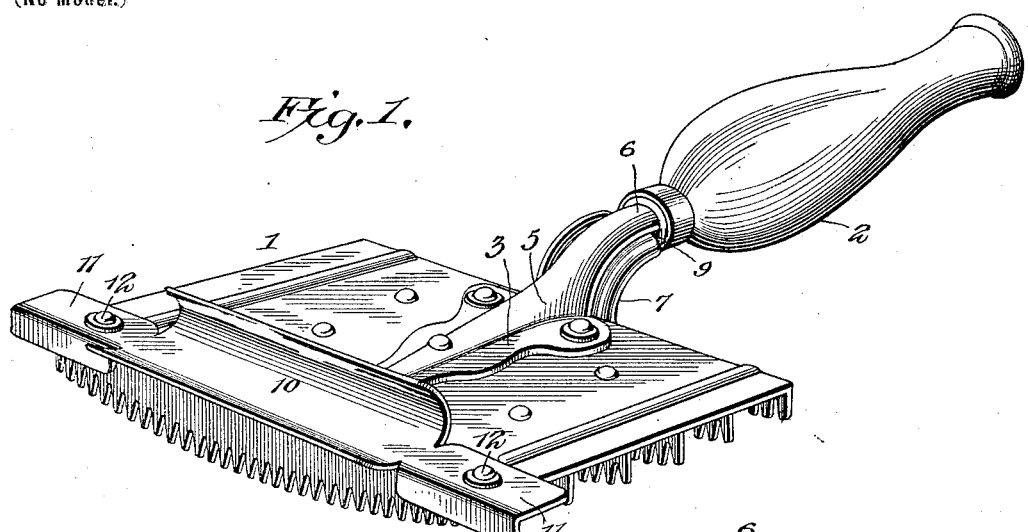
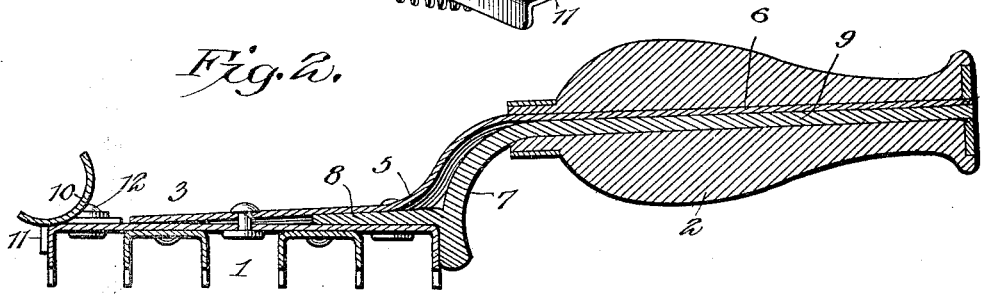
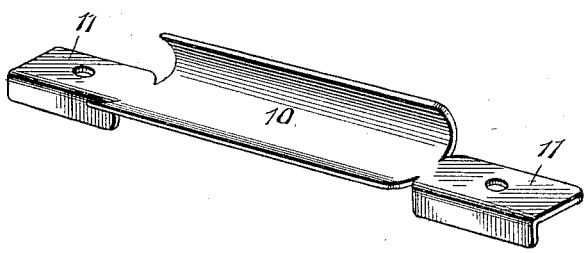
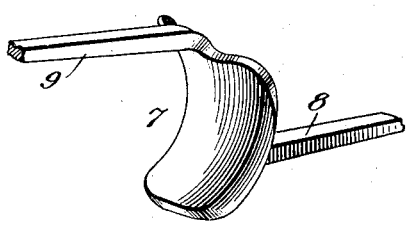
Clayton P. Breining, Inventor;
Witnesses

UNITED STATES PATENT OFFICE.

CLAYTON P. BREINING, OF COGAN STATION, PENNSYLVANIA.

CURRYCOMB.

SPECIFICATION forming part of Letters Patent No. 699,486, dated May 6, 1902.

Application filed September 11, 1901. Serial No. 75,085. (No model.)

*To all whom it may concern:*

Be it known that I, CLAYTON P. BREINING, a citizen of the United States, residing at Cogan Station, in the county of Lycoming and State of Pennsylvania, have invented a new and useful Currycomb, of which the following is a specification.

In the ordinary type of currycomb having a laterally-projected handle which is connected to the back of the comb by means of an angular shank it is common to grasp the body of the comb with the thumb across the angular shank and the fingers across the front edge of the body instead of grasping the handle, as this manner of holding the comb has been found more advantageous than to manipulate the comb by the handle. However, this manner of holding the comb has its disadvantages, as it is impossible to obtain a firm grasp of the finger-tips upon the front edge of the comb, and therefore the fingers are continually slipping therefrom. Moreover, it is difficult to prevent the finger-tips from projecting beyond the teeth of the comb, and therefore they are frequently rubbed against the horse and thereby injured.

In view of these disadvantages it is the object of the present invention to provide means for application to a currycomb to afford convenient and effective grasp portions for engagement by the thumb and fingers, so as to obviate slipping of the latter from the comb and also to prevent the fingers from being projected beyond the teeth.

It is furthermore designed to embody the invention in the form of attachments one of which is a finger-grasp and designed for application to the front edge of the back of a comb and arranged to embrace and stiffen the same and also to project at opposite sides thereof, so as to form knockers for contact with some object when cleaning the comb. The other attachment is a thumb-grasp, which is constructed for application to the outer or rear side of the usual angular shank and provided with means for connection with the back of the comb and the handle thereof without altering or changing the original parts of the comb.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a currycomb having the present invention applied thereto. Fig. 2 is a longitudinal sectional view thereof. Fig. 3 is a detail perspective view of the finger grasp-piece. Fig. 4 is a detail perspective view of the thumb grasp-piece.

Like characters of reference designate similar parts throughout the several figures of the drawings.

To illustrate the application of the present invention, I have shown an ordinary type of currycomb 1, which is provided with a laterally-projected handle 2, that is connected to the upper side of the back of the currycomb by means of an angular shank 3, the forward portion of which is riveted or otherwise secured to the back of the comb and is provided with a longitudinal upstruck corrugation 5. The outer end of the shank terminates in a tang 6, which is thrust in the inner end of the handle in the usual manner. It will be understood that these parts are common and ordinary and may vary in form, as they form no part of the present invention.

In carrying out the invention there is provided a thumb-piece 7, which is applied to the back of the shank 3 and consists of a comparatively broad plate which has its outer face concaved vertically and convexed transversely, so as to fit the inner side of the thumb. The lower end of this thumb-piece is provided with a forwardly-directed stem or tang 8, which is bent from the lower edge of the thumb-piece and lies slightly above the lower edge thereof, so that said lower edge portion may project below the back of the comb and bear against the rear edge thereof. This tang is designed to be inserted into the socket formed by the corrugation 5 and the back of the currycomb, thereby to secure the lower end of the thumb-piece in a convenient and simple manner. The upper edge of the thumb-piece is provided with a rearwardly-directed stem or tang 9, which lies snugly against the under side of the tang portion 6 of the shank and is also projected into the handle. By this arrangement it is apparent that the thumb-piece may be conveniently fitted in place without altering or changing any portion of the currycomb and merely requires the removal of the handle.

The finger-piece, which is struck from a sheet of metal, consists of an intermediate substantially semitubular body portion 10, which is provided at each end with an integral longitudinally-projected angular bracket portion 11, which is designed to snugly embrace the front edge of the back of the comb, to which it is connected by means of one or more rivets or other fastenings 12. As best illustrated in Fig. 1 of the drawings, it will be seen that each bracket is projected outwardly beyond the adjacent side edge of the currycomb, thereby to form a knocker to be struck against some object for the purpose of displacing dirt, &c., from the comb, as is a common practice. By the provision of these projected knockers the edges of the currycomb are protected. Moreover, the angular formation of the brackets to embrace the front edge of the back of the comb materially stiffens and strengthens the latter.

It will be noted that the rear portion of the curved or semitubular finger-piece rises higher than the front portion thereof, so as to form a comparatively broad upstanding flange or shoulder for engagement by the fingers, and the front edge of this finger-piece is projected slightly in front of the currycomb and is curved upwardly, so as to form a stop-flange to prevent the tips of the fingers from slipping outwardly and downwardly across the front edge of the comb.

From the foregoing description it is apparent that the present invention may be applied to currycombs as now commonly constructed without altering or changing the same and when applied does not interfere with the manipulation thereof, but, on the other hand, materially facilitates the manipulation of the comb. Moreover, the finger-piece stiffens and strengthens the front edge of the comb, while the thumb-piece braces the shank of the handle at its weakest point, particularly when knocking the comb to displace dirt, &c.

Having thus described my invention, what I claim as new, and desire to secure by Letters Patent, is—

1. The combination with a currycomb, having a rearwardly-projected handle and an angular shank having one end connected to the handle and its opposite end applied to the top of the back of the comb, of a thumb-piece fitted between the handle and the rear edge of the comb and having a lower forwardly-directed tang driven in between the back of the comb and that part of the shank which is connected thereto, and an upper rearwardly-directed tang driven into the handle, the outer face of the body of the thumb-piece being concaved vertically and convexed laterally, and a substantially semitubular finger-piece applied to the front of the back of the comb with its concaved face in front, its front edge projected in advance of the front edge of the comb and its rear edge rising above the latter, integral angular attaching-brackets at opposite ends of the body portion and embracing the top and front edge of the back of the comb, the outer ends of the brackets being projected beyond the respective side edges of the comb to form knockers, and fastenings piercing the brackets and the back of the comb.

2. As a new article of manufacture, a finger-piece for currycombs, struck from a sheet of metal and consisting of a substantially semitubular body portion, provided with opposite terminal angular attaching-brackets having substantially horizontal top members lying below the upper edge of the body, terminated short of the lower front edge of the body and provided with perforations, and front members pendent from the front edges of the top members and lying in rear of the lower bottom edge of the body, the brackets being of a length to project at opposite sides of a currycomb and form knockers.

3. The combination with a currycomb, having a rearwardly-projected handle, and an angular shank having one end connected to the handle and its opposite end applied to the top of the back of the comb, of a thumb-piece fitted between the handle and the rear edge of the comb and having a lower forwardly-directed tang driven in between the back of the comb and that part of the shank which is connected to the comb, and an upper rearwardly-directed tang driven into the handle, the outer face of the body of the thumb-piece being concaved vertically, convexed laterally and projected at opposite sides of the shank.

4. The combination with a currycomb, having a rearwardly-projected handle and an angular shank connecting the handle to the back of the comb, the forward portion of the shank being provided with an upstruck corrugation, of a thumb-piece having its upper end provided with a rearwardly-projected tang which is fitted into the adjacent end of the handle, and a forwardly-projected tang provided at the lower end of the thumb-piece and inserted into the socket formed by the corrugation of the shank and the adjacent portion of the back of the comb.

5. As a new article of manufacture, a thumb-piece for currycombs, consisting of a body having one face concaved longitudinally and convexed laterally, an integral tang projected rearwardly from one end and at the longitudinal concaved side thereof, and a second tang carried by the opposite end of the body and projected forwardly at the opposite side thereof.

In testimony that I claim the foregoing as my own I have hereto affixed my signature in the presence of two witnesses.

CLAYTON P. BREINING.

Witnesses:
JOHN H. SIGGERS,
FLORENCE E. WALTER.